United States Patent [19]
Read et al.

[11] Patent Number: 5,781,527
[45] Date of Patent: Jul. 14, 1998

[54] INTEGRATED MULTI-FABRIC DIGITAL CROSS-CONNECT INTEGRATED OFFICE LINKS

[75] Inventors: E. Lawrence Read, Plano; Steven D. Sensel, The Colony; Gary D. Hanson; Richard Schroder, both of Plano; Edward P. Traupman, McKinney; Gregory L. Mayhan, Richardson, all of Tex.

[73] Assignee: DSC Communications Corporation, Plano, Tex.

[21] Appl. No.: 604,890

[22] Filed: Feb. 22, 1996

Related U.S. Application Data

[63] Continuation-in-part of Ser. No. 304,510, Sep. 12, 1994, abandoned.

[51] Int. Cl.$^6$ ............... H04Q 11/04; H04L 12/26
[52] U.S. Cl. ............... 370/216; 370/244; 359/110
[58] Field of Search ............... 370/216, 217, 370/241, 242, 244, 290, 522, 524; 359/110, 135, 136, 139

[56] References Cited

U.S. PATENT DOCUMENTS

| | | | |
|---|---|---|---|
| 4,468,765 | 8/1984 | Hensel et al. | 370/1 |
| 4,580,291 | 4/1986 | ab der Halden | 455/606 |
| 4,817,204 | 3/1989 | Jannelli et al. | 455/607 |
| 4,866,704 | 9/1989 | Bergman | 370/85.4 |
| 4,905,219 | 2/1990 | Barr et al. | 370/4 |
| 4,922,481 | 5/1990 | Hicks | 370/4 |
| 5,065,454 | 11/1991 | Binz et al. | 359/184 |
| 5,086,348 | 2/1992 | Le Roy | 358/117 |
| 5,303,229 | 4/1994 | Withers et al. | 370/58.1 |
| 5,436,890 | 7/1995 | Read et al. | 370/60.1 |

OTHER PUBLICATIONS

H. R. Salloum and S. Yoneda, "B–ISDN User Network Interface: Implementation of Performance Monitoring Functions Using SONET Overhead," Communications, 1990 IEEE International Conference, pp. 822–825.

*Primary Examiner*—Melvin Marcelo
*Attorney, Agent, or Firm*—Baker & Botts, L.L.P.

[57] ABSTRACT

An integrated multiple cross-connect system (10) having remotely located components interconnected by integrated office links is provided. The system (10) includes a broadband matrix (20), at least one remotely located high speed line terminating equipment (30, 32) coupled to a telecommunications network, and an integrated office link (34, 36) interconnecting the broadband matrix (10) and high speed line terminating equipment (30, 32), the integrated office link (34, 36) carrying duplex transmission of an IOL-N signal of N multiplexed STS-1P optical signals at an OC-N rate, the STS-1P signal including data payload and overhead fields. Further included is a remotely located wideband matrix (22), a second integrated office link (40) interconnecting the broadband matrix (20) and the remotely located wideband matrix (22), and at least one remotely located low speed line terminating equipment (54) coupled to a telecommunications network, where the wideband matrix (22) and low speed line terminating equipment (54) are interconnected by a third integrated office link (59). Fault coverage information including a cross-connect channel identification code and a parity value are among the IOL overhead fields. The fault coverage information in the IOL overhead fields are monitored at selected points along a transmission path.

35 Claims, 6 Drawing Sheets

| TRANSPORT OVERHEAD | | | PATH OVERHEAD |
|---|---|---|---|
| FRAMING A1 | FRAMING A2 | STS-1 ID C1 | TRACE J1 |
| BIP-8 B1 | ORDERWIRE E1 | USER F1 | BIP-8 B3 |
| DATA COM D1 | DATA COM D2 | DATA COM D3 | SIGNAL LABEL C2 |
| POINTER H1 | POINTER H2 | POINTER ACTION H3 | PATH STATUS G1 |
| BIP-8 B2 | APS K1 | APS K2 | USER CHANNEL F2 |
| DATA COM D4 | DATA COM D5 | DATA COM D6 | INDICATOR H4 |
| DATA COM D7 | DATA COM D8 | DATA COM D9 | GROWTH/DQDB Z3 |
| DATA COM D10 | DATA COM D11 | DATA COM D12 | GROWTH Z4 |
| GROWTH Z1 | GROWTH/FEBE Z2 | ORDERWIRE E2 | GROWTH Z5 |

The first three columns belong to SECTION OVERHEAD (rows 1–3) and LINE OVERHEAD (rows 4–9).

FIG. 8

INTEGRATED MULTI-FABRIC DIGITAL CROSS-CONNECT INTEGRATED OFFICE LINKS

RELATED APPLICATIONS

This application is a continuation-in-part of application Ser. No. 08/304,510 filed Sep. 12, 1994 entitled Integrated Multi-Fabric Digital Cross-Connect Integrated Office Links," by E. Lawrence Read, Steven D. Sensel, Gary D. Hanson, and Richard (nmi) Schroder, now abandoned.

This application is related to co-pending applications entitled: Integrated Multi-Fabric Digital Cross-Connect Timing Architecture, (Attorney Docket No. 36560-0799), Ser. No. 08/176,125, filed Dec. 30, 1993, now U.S. Pat. No. 5,526,359; Integrated Multi-Rate Cross-Connect System, (Attorney Docket No. 36560-773), Ser. No. 08/176,548, now U.S. Pat. No. 5,436,890 issued Jul. 25, 1995; Apparatus and Method for Clock Alignment and Switching, (Attorney Docket No. 36560-848), Ser. No. 08/262,921, filed Jun. 21, 1994, now U.S. Pat. No. 5,515,403 and Grooming Device for Streamlining a Plurality of Input Signal Lines Into a Grouped Set of Output Signals, (Attorney Docket No. 36560-0849), Ser. No. 08/288,330, now U.S. Pat. No. 5,493, 656 issued Feb. 20, 1996.

TECHNICAL FIELD OF THE INVENTION

This invention relates in general to the field of telecommunication systems. More particularly, the present invention relates to an integrated office link interconnecting the multiple matrix subsystems for transporting network traffic.

BACKGROUND OF THE INVENTION

Digital cross-connect systems are an integral part of telecommunications transport network. They are increasingly used by all service providers including exchange carriers, long distance carriers, and competitive bypass carriers. Existing digital cross-connect system architectures generally have been based on a single core approach where all cross-connections are made through a single switching node or fabric. To handle the layered signal structures used in today's transport networks, these single switching nodes have been connected in series.

Because new data, voice and imaging applications are causing a fundamental shift in the nature of network traffic, the network architecture is required to evolve to accommodate this change. Instead of being dominated by voice data, as in the past, the network traffic will increasingly carry bursty high-speed data transmissions. User applications and new network technologies including frame relay, switched multi-megabit data service and asynchronous transfer mode (ATM) are driving the transport network toward the synchronous optical network or SONET. SONET is a new transport medium, designed to enable mid-span meets between central office switching systems. It defines optical signals and a synchronous frame structure for multiplexed traffic as well as for operations and maintenance procedures.

SONET brings a multi-dimensional increase in network complexities. There is a wide variety of signal formats that are embedded in new broadband and wideband synchronous payload envelopes (SPEs). DS1 signals provide the primary transport rate for North America. DS1 frames are capable of carrying twenty-four DS0 (64 kbs) voice or data channels. DS1 signals can be mapped in the new SONET STS-1 (synchronous transport signal level 1) SPEs in a number of ways. 1) The DS1 signals can be multiplexed into DS3 frames via M1/3 multiplexers and the DS3 signals can be asynchronously mapped into the STS-1 SPE. 2) The DS1 signals can be synchronously or asynchronously mapped into floating VT1.5 (virtual tributary) payloads and the VT1.5 signals can be multiplexed in the STS-1 SPE. However, these approaches create three incompatible wideband structures, which must be individually groomed, multiplexed and switched to assure end-to-end signal integrity. This analysis brings to light the fact that networks can no longer deliver traffic transparently. Because the networks have to recognize different payloads to deliver traffic intact between users, the digital cross-connect system must be able to handle all three formats equally well.

Accordingly, advantages have been recognized for a digital cross-connect system that integrates narrowband, wideband and broadband subsystems to route and manipulate circuit as well as cell-based traffic. To accomplish this task, there is provided a unique linkage to interconnect non-co-located cross-connect matrices and equipment to transport data, control, timing information, and selected network overhead information. Furthermore, path protection measures are provided to ensure end-to-end path integrity.

SUMMARY OF THE INVENTION

In accordance with the present invention, an integrated multi-fabric cross-connect integrated office link is provided which eliminates or substantially reduces the disadvantages associated with prior systems.

In one aspect of the invention, the integrated multi-fabric cross-connect system includes a broadband matrix, at least one high speed line terminating equipment coupled to a telecommunications network, and an integrated office link interconnecting the broadband matrix and high speed line terminating equipment, the integrated office link carrying duplex transmission of an Optical IOL-N signal of N multiplexed STS-1P signals at an OC-N rate. The broadband matrix and the high speed line terminating equipment each includes optical interface circuitry coupled to the integrated office link which receives and transmits the IOL-N optical signals and further converts between the N multiplexed STS-1P optical signals and N demultiplexed STS-1P electrical signals. The IOL-N signal transmitted on the integrated office link includes payload and overhead fields carrying control information and fault coverage data.

In another aspect of the invention, an integrated multi-fabric cross-connect system having remotely located components interconnected by integrated office links is provided. The system includes a broadband matrix, at least one remotely located high speed line terminating equipment coupled to a telecommunications network, and an integrated office link interconnecting the broadband matrix and high speed line terminating equipment, the integrated office link carrying duplex transmission of an Optical IOL-N signal of N multiplexed STS-1P optical signals at an OC-N rate, the STS-1P signal including data payload and overhead fields. Further included is a remotely located wideband matrix, a second integrated office link interconnecting the broadband matrix and the remotely located wideband matrix via TSP Unit, and optionally one or more remotely located low speed line terminating equipment coupled to a telecommunications network, where the wideband matrix and low speed line terminating equipment are interconnected by a third integrated office link. Fault coverage information including a cross-connect channel identification code and a parity value are among the IOL overhead fields. The fault coverage information in the IOL overhead fields are monitored at selected points along a transmission path. Upon detecting a fault, all the monitors in the transmission path are enabled to monitor the IOL overhead fault coverage information to isolate the origin of the detected fault.

In yet another aspect of the invention, a method for interconnecting remotely located cross-connect matrices and associated line terminating equipment coupled to a telecommunications network is provided. The method includes the steps of receiving a network signal including network data and overhead fields from the telecommunications network, extracting the network overhead fields. The extracted network overhead fields are terminated and processed or routed to attached processors where the overhead can be processed or routed to the MI for insertion into the IOL-N signal for routed to a centralized overhead processor collocated with the broadband matrix. The STS SPE is converted to a STS-1P by adding overhead field containing fault coverage information. STS-1P signals are multiplexed with IOL COM data from the Unit Controllers, OHT data from the Application Processors, and IOL Fault coverage information to create the OIL-N optical signal. The signal is transmitted on an integrated office link to a remote cross-connect matrix where the IOL fault coverage information is terminated, the IOL COM date is extracted and routed to the TCC subsystem, the OHT data is extracted and routed to a centralized overhead processor, and the STS-1P signal are demultiplexed and cross-connected.

BRIEF DESCRIPTION OF THE DRAWINGS

For a better understanding of the present invention, reference may be made to the accompanying drawings, in which.

DETAILED DESCRIPTION OF THE INVENTION

The preferred embodiment of the present invention and its advantages are best understood by referring to FIGS. 1-10 of the drawings, like numerals being used for like and corresponding parts of the various drawings.

Figure 1:
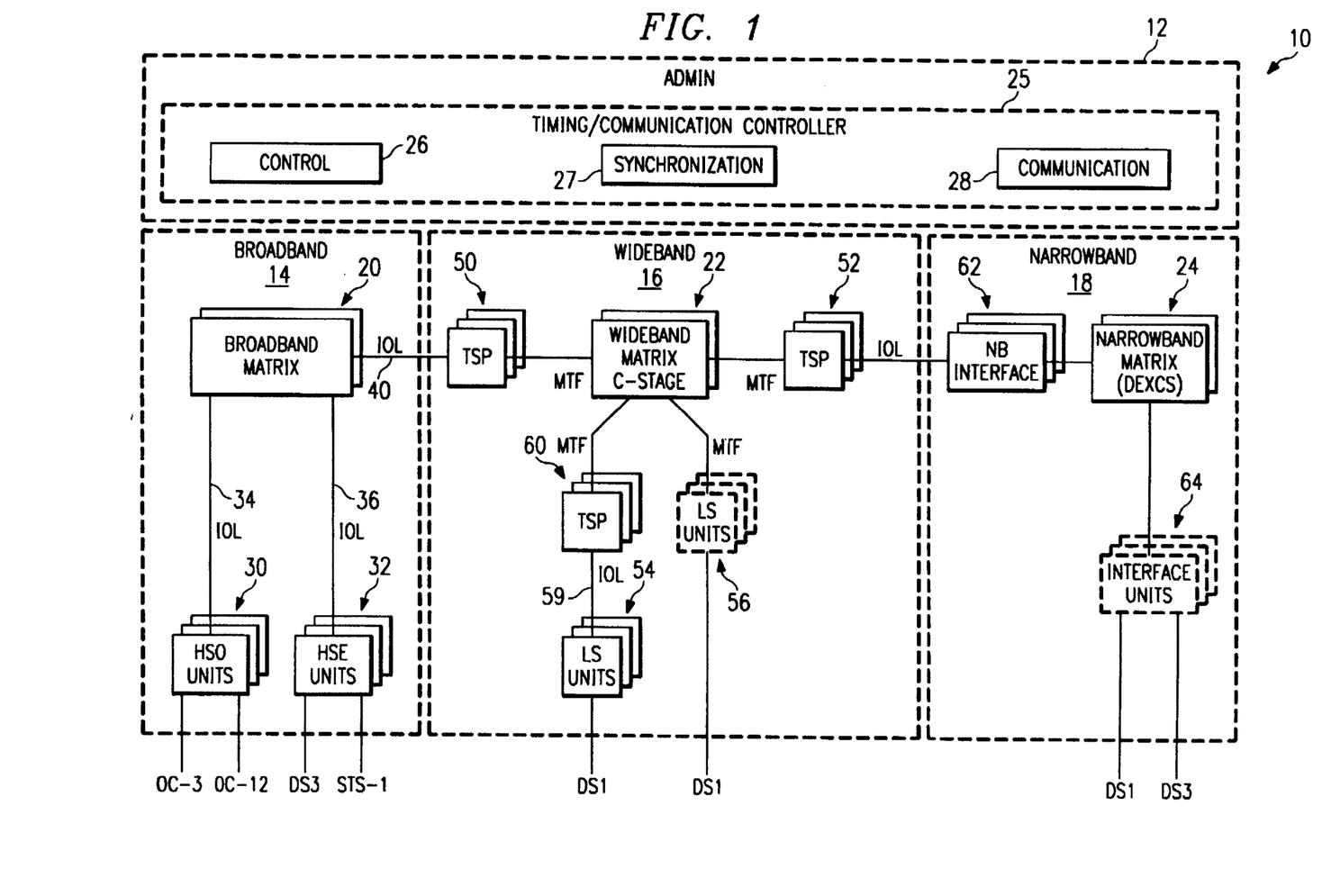
FIG. 1 is a high level block diagram of an embodiment of the integrated multi-fabric digital cross-connect system hardware architecture.

Referring to FIG. 1, a high level hardware architecture block diagram of an integrated multi-fabric digital cross-connect system 10 is shown. Integrated multi-fabric digital cross-connect system 10 includes an administration and control subsystem 12, which provides alarming processing and provisioning, craft access, timing and communication controls, and like administrative functions for system 10. Administration and control subsystem 12 includes separate and independent timing subsystems for cross-connect matrices 20–24 if they are not located in close proximity with one another. When not co-located, an independent time base is provided for each broadband 14, wideband 16, and narrowband subsystem 18.

Administration and control subsystem 12 includes a timing/communication controller subsystem 25 which comprises three units: control 26, synchronization 27, and communication 28. If cross-connect subsystems 14–18 are co-located, such as in a small system with the subsystems located in close proximity with one another, a common timing/communication controller subsystem 25 may be used. If subsystems 14–18 are not co-located, a separate timing/communication controller subsystem 25 providing separate and independent timing reference signals to each subsystem 14–18 is used. This timing scheme creates a unique timing architecture where three time bases are employed within one integrated system 10. Therefore, frequency justification and phase alignment at time base boundaries and other points in the system are addressed.

Administration and control subsystem 12 is coupled to broadband, wideband, and narrowband subsystems 14–18 via standard communication interfaces or optical links for longer distances. The optical links in system 10 have been termed integrated office links or IOLs, and may be referred to as such hereinafter. The IOLs operate at an OC-N rate and carry payload data, timing information, Control information, fault coverage information, and overhead extracted from network interface cards in the IOL overhead fields. Each broadband, wideband, and narrowband subsystems 14–18 includes a separate matrix 20–24 for signal cross-connection at each level. Broadband matrix 20 may be of a non-blocking three stage space architecture switching signals preferably at the STS-1 rate. Wideband matrix 22 may also be of the three stage space architecture switching signals at the VT1.5 or VT2 rate. Additionally, both matrices 20 and 22 may use multiple matrix channels to switch higher rate and concatenated signals. These include but are not limited to STS-3C, STS-12C, VT3, VT6, and VT6Nc. Narrowband matrix 24 provides redundant non-blocking dual-time slot interchange matrix planes to cross-connect signals at lower rates, including DS0. Both North American and European rates and formats are supported. System 10 therefore supports asynchronous terminations at the DS1 and DS3 rates and synchronous SONET terminations at the STS-1 and OC-N rates including OC-3 and OC-12.

Broadband matrix 20 is coupled to associated high speed optical (HSO) and electrical (HSE) unit shelves 30 and 32 using optical IOLs 34 and 36, respectively. Signals transported on IOLs may be in standard OC-12 frame format with some modified use of the overhead fields. Each IOL carries twelve STS-1-like (STS-1P) payloads and a number of non-standard overhead fields containing signals used for internal fault coverage, communication channels, a superframe indicator signal, and information associated with network terminations. These overhead fields and their functions are discussed in more detail below.

When used for interconnecting the cross connect fabrics, IOLs carry network traffic, timing information, and fault coverage signals. IOLs 34 and 36 are also used to connect high speed units 30 and 32 to broadband matrix 20 and to connect remote low speed units 54 to wideband matrix 22. When used to connect unit shelves, IOLs carry maintenance and control signals and overhead signals associated with the network terminations in addition to network traffic. Each IOL may be defined in system 10 to have up to a maximum of two kilometers in length. The long-distance capability of the IOLs provides flexibility in the physical arrangement of the bays to achieve a variety of floor plans and minimize installation costs.

As shown, OC-N signals including OC-3 and OC-12 signals are line terminated in high speed optical units 30 which are coupled to broadband matrix 20 via IOL 34. Full electrical STS-1 and DS3 line termination is provided at high speed electrical unit 32. Network signals are cross-connected through broadband matrix 20 at the STS-1 rate. STS-1 synchronous payload envelopes (SPEs) associated with OC-N or electrical STS-1 signals are cross-connected in STS-1P frames locked to the broadband time base. DS3 cross-connection is done by asynchronously mapping DS3 signals into STS-1 SPE signals in accordance with the SONET standard, which are then mapped into STS-1P frames.

Broadband matrix 20 is further coupled to wideband subsystem 16 via IOL 40. Wideband subsystem 16 is coupled to narrowband subsystem 18 via another IOL 42. As discussed above, IOLs 34, 36, 40, and 42 may be up to two kilometers in length and is adapted for carrying twelve STS-1P payloads and overhead fields. The information in the overhead fields carried by the IOLs are non-standard and are used for maintenance, control, fault coverage, and transport of overhead extracted from network interface cards to a centralized overhead processor. Bidirectional traffic on optical links IOLs 34, 36, 40, and 42 are transmitted at the standard SONET OC-12 rate.

Broadband matrix 20 is coupled to wideband matrix 22 through an interface unit or tributary signal processors (TSP) 50. Tributary signal processors 52 also act as interfaces between wideband matrix 22 and narrowband subsystem 18, and between wideband matrix 22 and low speed (LS) units 54. Tributary signal processors 50-54 play an important role in the timing architecture of integrated multi-fabric digital cross-connect system 10, details of which are described below.

Wideband subsystem 16 supports line terminations including DS1 or E1 signals. Higher rate network signals, including DS3 and STS-1, may access wideband subsystem 16 through broadband subsystem 14. DS1 termination is performed at remote and/or local low speed unit subsystems 54 and 56, where remote low speed unit 54 is coupled to wideband matrix via an IOL 58 through another tributary signal processor 60. Wideband signals are cross-connected in modified synchronous channels that contain nonstandard a payload envelope capable of carrying a VT2 signal. Asynchronous signals such as DS1, E1 and VT signals are mapped into the wideband modified channels for internal nonstandard transport and cross-connection. E1, DS1C and DS2 gateways and asynchronous cross-connections are provided by mapping the signals into VT2, VT3, and VT6 payload envelopes, respectively, using the standard SONET mapping specifications. The matrix transport format (MTF) signals contain 28 channels, each of which is capable of carrying a VT2 payload. As shown in FIG. 1, signal traffic between wideband matrix 22 and tributary signal processors 50, 52, and 60, and low speed units 56, and conversion unit 59 are all in the matrix transport format. For a more detailed description of the matrix transport format, please refer to co-pending and commonly assigned application titled Integrated Multi-Rate Cross-Connect System (Attorney Docket No. 36560-773), incorporated herein by reference.

Narrowband matrix 24 is coupled to wideband subsystem 16 through a narrowband interface unit 62. Cross-connect interface units 64 coupled to narrowband matrix 24 provide electrical termination of signals at rates that include the DS1 and DS3 bandwidths. Narrowband subsystem 18 is generally arranged to access network traffic through wideband subsystem 16. Lower rate signals, including DS0, are cross-connected by narrowband matrix 24. For a more detailed description of integrated multi-fabric digital cross-connect system hardware architecture, please refer to the co-pending application titled Integrated Multi-Rate Cross-Connect System, (Attorney Docket No. 36560-773).

Figure 2A:
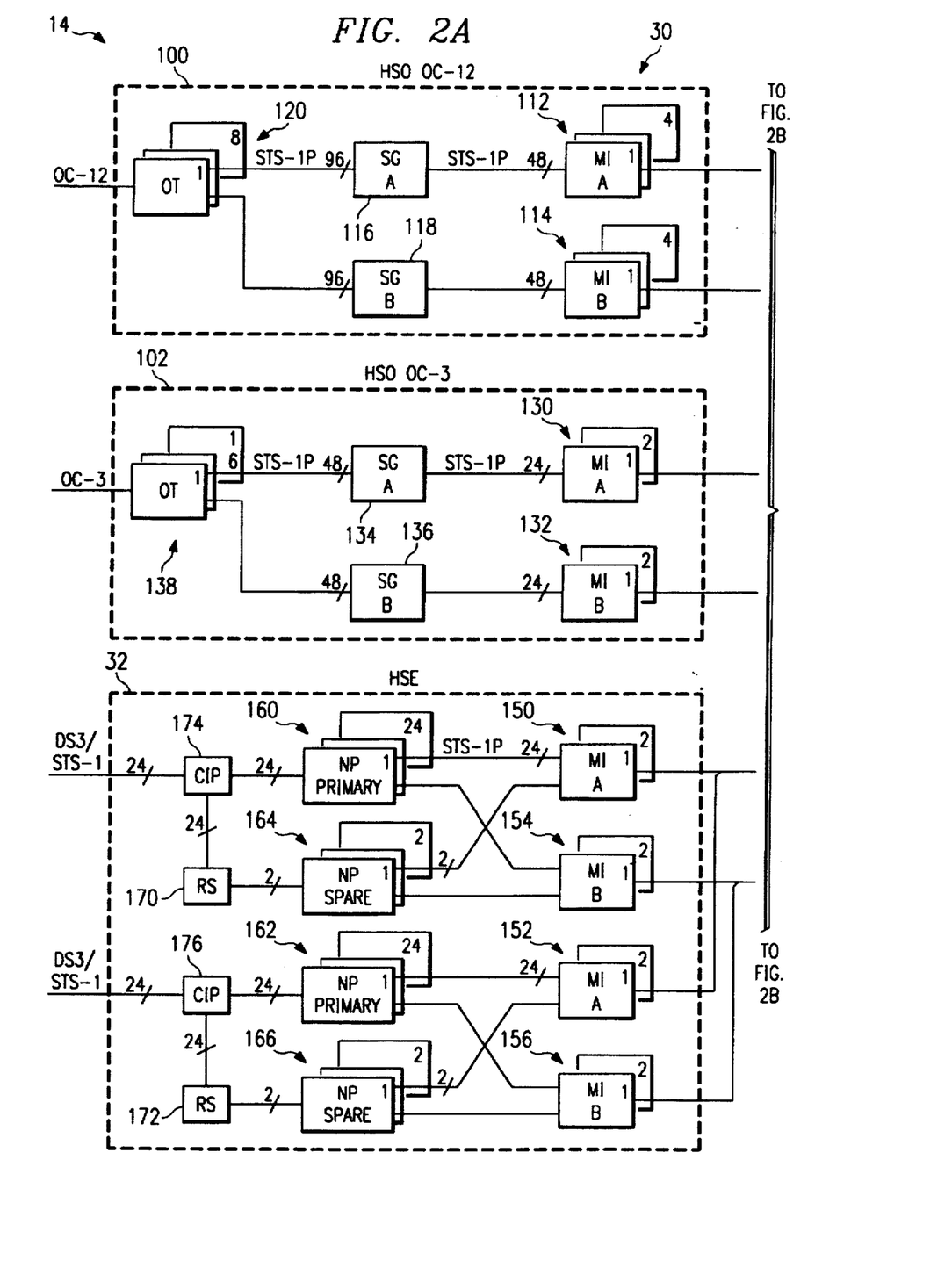
FIGS. 2A and 2B are a more detailed block diagrams of an embodiment of the broadband fabric.
Figure 2B:
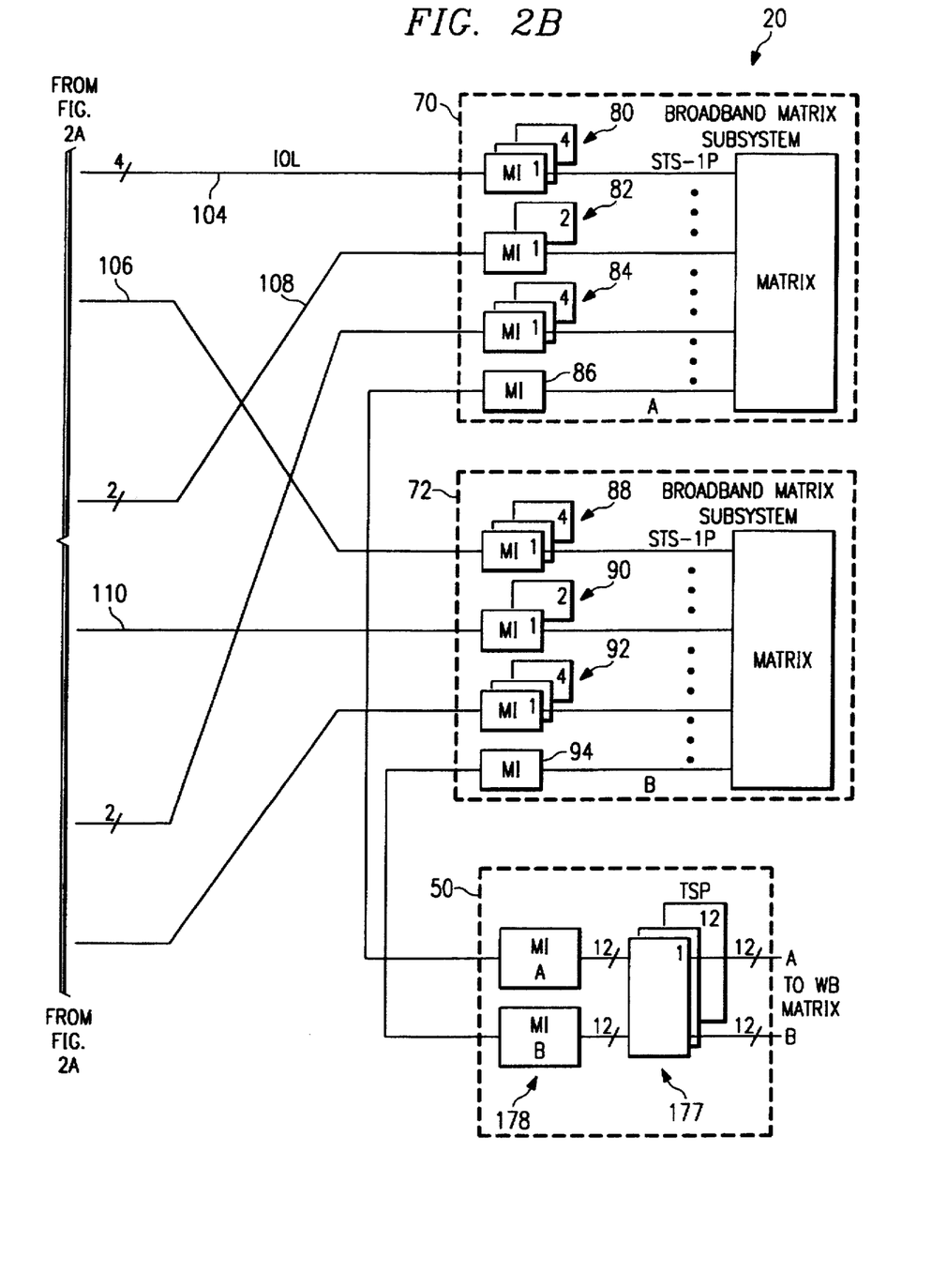

Referring to FIG. 2, broadband fabric 14 is shown in more detail. Broadband matrix 20 is duplicated into A and B copies or planes 70 and 72 with associated matrix interface (MI) units 80–94 acting as the interface to the IOLs and performing primarily the multiplexing and demultiplexing functions between the STS-1P and IOL signals. Coupled to broadband matrix 20 by IOLs 104–110 are high speed optical (HSO) units or shelves 100 and 102, which primarily function as the interface between broadband matrix 20 and the optical domain. High speed optical units 100 and 102 terminate SONET OC-N signals including OC-12 and OC-3 signals, as shown. OC-12 High speed optical unit 100 includes matrix interface units 112 and 114 for multiplexing and demultiplexing the A and B copies of the IOL signals carried on IOLs 104 and 106, respectively. Matrix interface units 112 and 114 are coupled to A and B copies of signal groomers (SG) 116 and 118, which groom or switch STS-1P signals received from matrix interface units 112 and 114 or optical terminators (OT) 120. Groomers 116 and 118 may be coupled to unit controllers shown in FIG. 3. Similarly, OC-3 high speed optical shelf 102 includes A and B copies of matrix interface units 130 and 132, signal groomers 134 and 136, and optical terminators 138.

For connection with wideband matrix subsystem, tributary signal processor units 50 are provided. Tributary signal processor units 50 include redundant tributary signal processors 177 and matrix interface units 178. Matrix interface units 178 convert between the IOL optical signals and STS-1P signals, and tributary signal processors 177 path terminate the STS-1P signals to extract the DS3, DS1 or VT signals and map them into matrix transport format signals for transmission to the wideband matrix.

Figure 3:
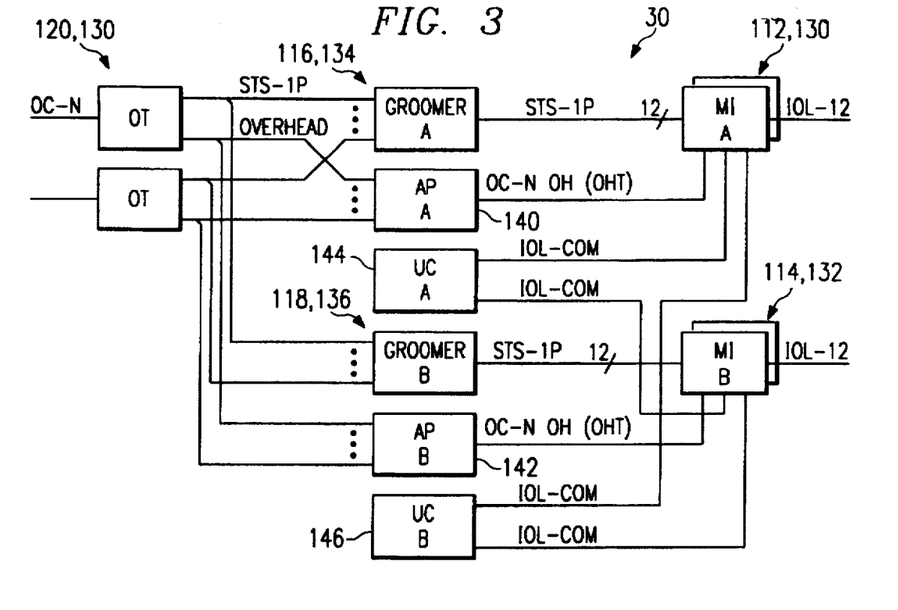
FIG. 3 is a block diagram of an embodiment of the high speed optical line terminating unit overhead connections.

Referring also to FIG. 3, a simplified block diagram showing the routing and processing of the overhead field information in high speed optical units 30 is shown. Inbound data is received from the optical domain at the receive input of optical terminators 120 and 138 in the OC-N format. The optical signal is converted to a NRZ electrical signal, from which clock and frame are recovered, and the quality of the STS-N signal is checked. The data then may be unscrambled and demultiplexed into STS-1 signals.

The section and line overhead bytes are extracted at this time and processed. Those overhead bytes associated with network signals not processed in optical terminators 120 and 138 are routed to the A and B copies of attached processors 140 and 142 for processing and termination. Alternatively, the overhead may be routed through the attached processors to the MIs for insertion into the IOL-N. The overhead is extracted at the broadband matrix and can be routed to a centralized overhead processor for processing and termination. After the overhead information is extracted and processed, the STS-1 signals are pointer processed as specified by the SONET standard, and the STS synchronous payload envelope (SPE) is extracted and timed to the system. Non-standard STS-1P overhead data are inserted into the line overhead and the resultant STS-1P signals are routed and transmitted to redundant groomers 116, 134, 118, and 136, where the signals are switched and protected as instructed by unit controllers 144 and 146.

The output STS-1P signals are then routed to redundant matrix interface units 112, 130, 114, and 132. At matrix interface units 112, 130, 114, and 132, the quality of each STS-1P signal is checked. Matrix interface units 112, 130, 114, and 132 further multiplexes twelve STS-1P signals into the IOL signal. Note that this embodiment of the IOL is at the OC-12 rate although other rates also may be implemented. Certain non-standard overhead fields including extracted network overhead and some fault coverage fields are generated in attached processors 140 and 142 are mapped into the overhead transport (OHT) fields of the IOL overhead for transport to the centralized processing complex. Unit controllers 144 and 146 further generate control information (IOL-COM) to be communicated via the broadband matrix to the TCC subsystem 25. Two IOL-COM channels (A and B copies) are used for this purpose, and the IOL-COM information are inserted into the appropriate fields in the IOL overhead IOL fault coverage fields are inserted by the MI.

Outbound data is received from the redundant broadband matrix 20 at the optical input of matrix interface units 112, 130, 114, and 132. The IOL optical signal is converted into a NRZ STS-12P electrical signal, from which the clock signal is recovered. Frame is also recovered an the quality of the STS-12P signal is checked. Data is then unscrambled and demultiplexed into twelve STS-1P signals. IOL-COM overhead bytes are extracted from the IOL overhead fields and forwarded to unit controllers 144 and 146 where the information is interpreted and appropriate action is performed. Overhead transport fields are also routed via the attached processors 140 and 142 to the Optical Terminators 120 and 138. These fields can be selected for insertion in the outbound network signal overhead. The STS-1P signals are reconditioned and routed to groomers 116, 134, 118, and 136, which switch and protects the STS1P signals. Output STS-1P signals are transmitted to optical terminators 120 and 138, which check the quality of each signal, insert the overhead bytes and multiplex the STS-1 signals into appropriate STS-N signals, and convert the STS-N signals to appropriate OC-N optical signals for transmission onto the network.

Also coupled to broadband matrix 20 is a high speed electrical (HSE) unit or shelf 32. High speed electrical unit 32 includes matrix interface units 150–156 for the A and B redundant planes, which are coupled to two groups of 24 network pack (NP) units 160 and 162 and two spare units 164 and 166. Network pack units 160–166 are line terminating equipment for either DS3 or STS-1 termination. In each group, one spare network pack unit is dedicated to DS3 protection, and the other is dedicated to STS-1 protection. A redundancy switch (RS) 170 and 172 is provided to switch over to one of the two spare units for each group of network pack units if a primary network pack unit fails.

Interfaces to network cables carrying DS3 or STS-1 rate traffic are provided by customer interface panels (CIP) 174 and 176. As is evident in FIG. 2, high speed electrical unit 32 has the capacity to terminate 48 DS3 and/or STS-1 network signals with equipment protection for DS3 and STS-1 signals.

Figure 4:
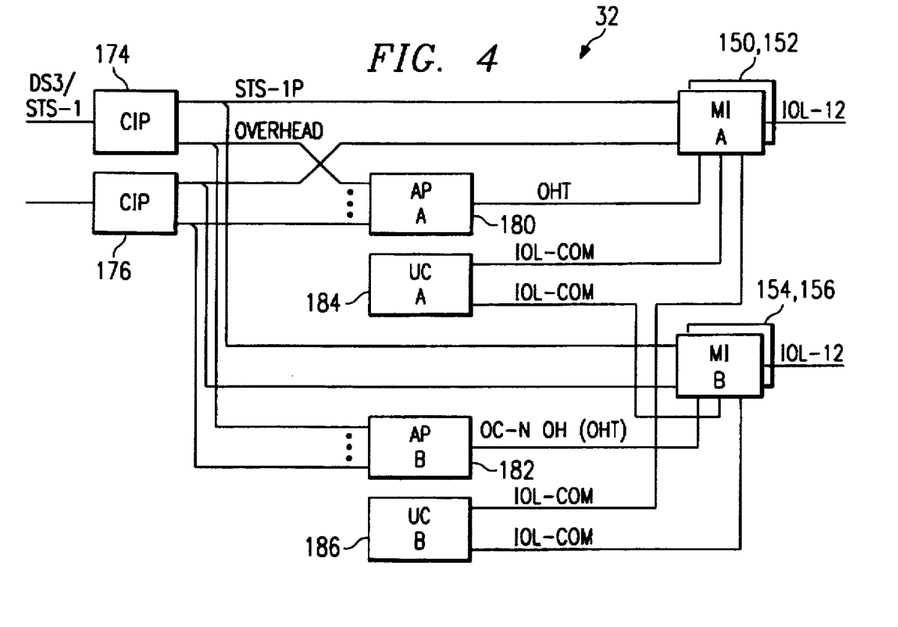
FIG. 4 is a block diagram of an embodiment of the high speed electrical line terminating unit overhead connections.

Referring also to FIG. 4, the overhead routing and processing in high speed electrical units 32 is shown. Certain section and line overhead bytes are processed and terminated in customer interface panels 174 and 176, but other overhead bytes not processed therein are routed to attached processors 180 and 182 or to a centralized processing complex for processing. Attached processors 180 and 182 generate overhead transport fields, which are routed to matrix interface units 150–156 for insertion into the IOL signals. Redundant unit controllers 184 and 186 are also provided to control high speed electrical unit 32 operations which also communicate with the Timing/communications controller subsystem 25 via IOL overhead fields.

Figure 5:
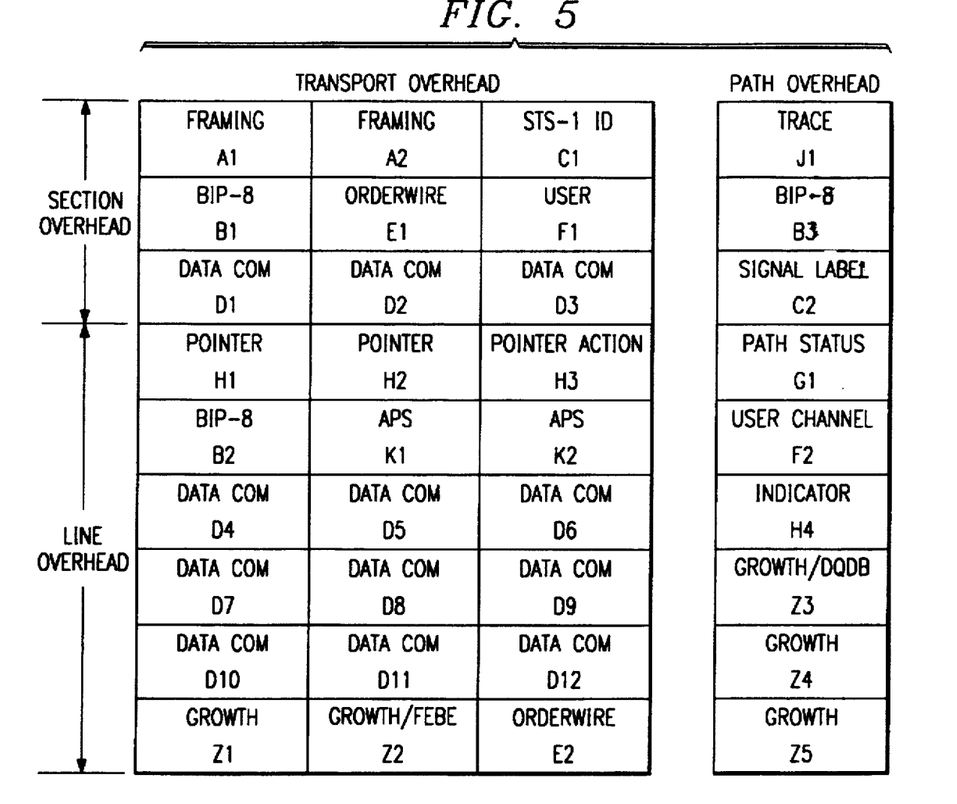
FIG. 5 is a chart of SONET transport and path overhead byte designations.

Referring to FIG. 5, a diagram illustrating the SONET transport and path overhead byte designations is shown. The format and functions of these overhead fields are well defined by the SONET standard, details of which may be located in Bellcore publications, *Synchronous Optical Network (SONET) Transport Systems: Common Generic Criteria*, Technical Reference TR-NWT-000253 and Technical Advisory TA-NWT-000253. Other related Bellcore publications may also be consulted. The overhead fields are further summarized in TABLES 1 and 2.

TABLE 1

| STS-1 SECTION OVERHEAD | |
|---|---|
| A1–A2 | Framing |
| C1 | STS-1 Identification |
| B1 | Section Bit Interleaved Parity (BIP) –8 |
| E1 | Orderwire |
| F1 | Section User Channel |
| D1–D3 | Section Data Communication Channel |

TABLE 2

| STS-1 LINE OVERHEAD | |
|---|---|
| H1–H2 | Pointer |
| H3 | Pointer Action Byte |
| B2 | Line Bit Interleaved Parity (BIP) -8 |
| K1–K2 | Automatic Protection Switching Channel |
| D4–D12 | Line Data Communication Channel |
| Z1–Z2 | Line Growth |
| E2 | Orderwire |

As described above, certain overhead bytes are processed and terminated in the network interface units (OT and CIP) of high speed optical and electrical units, and certain other overhead bytes are routed to attached processors for processing. The attached processors further generate and receive non-standard network overhead transport information (OHT) and the unit controllers further generate and receive non-standard IOL communication channel information (IOL-COM) for insertion into the IOL overhead. Therefore, the IOL overhead fields include all of the SONET section and line overhead fields with a redefinition of selected overhead fields. The IOL overhead fields may be categorized into four groups as summarized in TABLE 3.

TABLE 3

| IOL OVERHEAD GROUPS | |
|---|---|
| STS-1P OH | STS-1P Overhead Fields |
| OHT | Network Overhead Transport |
| B1 | IOL Fault Coverage BIP-8 |
| IOL-COM | IOL Communication Channel |

Specifically, certain STS-1P overhead fields provide fault detection and isolation information and control. The STS-1P overhead is summarized in TABLE 4:

TABLE 4

| STS-1P OVERHEAD | |
| --- | --- |
| EC-BIP | Envelope Capacity BIP-8 |
| BCID | Broadband Channel Identification |
| SME | STS-1P Monitor Enable |
| SFI | Superframe Indicator |
| DSAI | DS3 Alarm Indicator |
| STAI | STS-1 Alarm Indicator |

Briefly, EC-BIP is even envelope capacity bit interleaved parity-8 used to detect parity error in the transmission. BCID is a unique channel identification code assigned to each terminating point in the cross-connect matrix used to detect end-to-end faults. SME is a bit used to synchronize the fault isolation process. SFI is used to define a 48 frame superframe structure used in wideband subsystem 16. DSAI is used to indicate to down stream equipment that DS3 alarm indication signal (AIS) is generated or a network condition that caused the AIS to be generated was detected and reported at the DS3 interface. STAI is used to indicate that STS path alarm indication signal (AIS) is generated or a network condition that caused it to be generated was detected for a STS-1 signal received from the network.

Figure 6:
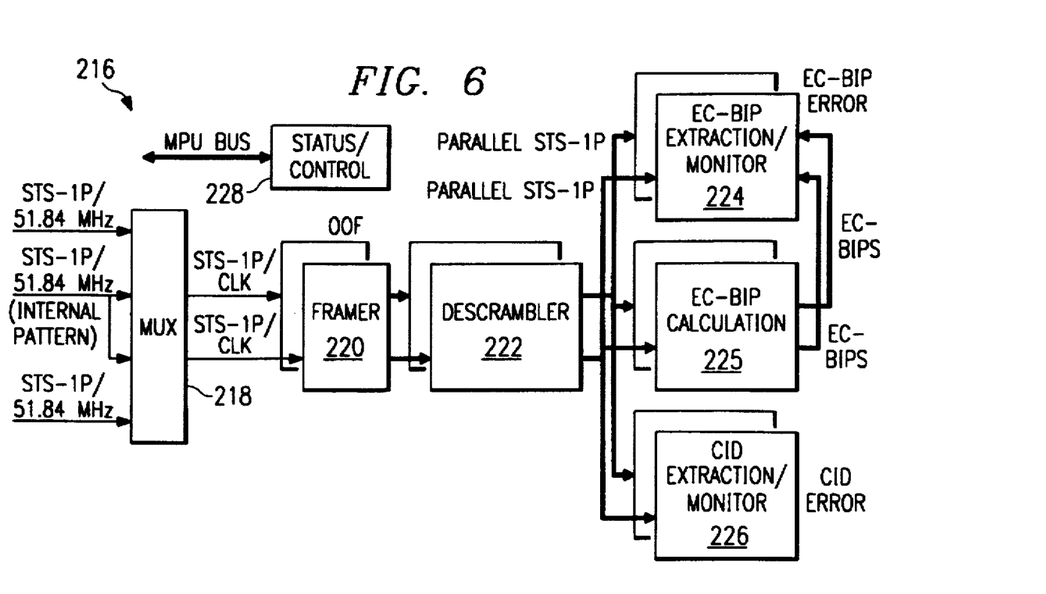
FIG. 6 is a simplified block diagram of an embodiment of a STS-1P path monitor.

Referring to FIG. 6, a STS-1P path monitoring portion 216 of circuit 210 of FIG. 5 is shown. STS-1P path monitoring circuit 216 includes a front end multiplexer 218 which selects from two STS-1P and clock data streams and two internally generated STS-1P and clock data streams. The internally generated bit streams may be selected for system diagnostic and testing purposes. The selected STS-1P data streams are received by framers 220 which detects the framing pattern in bytes A1 and A2 of the STS-1P overhead (FIG. 5). Upon detection of the A1 and A2 pattern, a byte-wide frame pulse is created that identifies the C1 byte immediately after A1 and A2. Each framer 220 converts the data stream and outputs byte-wide parallel data. An out-of-frame (OOF) signal is generated when a predetermined number of consecutive errored framing patterns are received. The out-of-frame signal or bit is cleared after two consecutive error-free frames are received. The byte-wide data are subsequently provided to a descrambler 222 which may be instructed to descramble the frame bytes other than bytes A1, A2 and C1.

The output from descrambler 222 are then provided to a number of error monitoring circuits including an envelope capacity bit interleaved parity-8 (EC-BIP) monitor 224, EC-BIP calculator 225, and a channel identification (CID) monitor 226. Even parity BIP-8 is monitored over the line envelope capacity of an STS-1P frame. In accordance with SONET definitions, each STS-1P frame carries the EC-BIP of the previous STS-1P frame. Therefore, EC-BIP calculator 225 receives the current byte-wide STS-1P signals from descrambler 222 and computes the even parity BIP-8 according to SONET definition. The computed EC-BIP is then provided to EC-BIP monitor 224 which compares the computed EC-BIP with the EC-BIP extracted from the subsequent STS-1P frame. If the two values are not equal, then a parity error is present. A counter (not shown) may be used to accumulate the number of errors occurring. The error counter and BIP values may be accessible by processor control. Note that the EC-BIP byte is defined in SONET line overhead and may occupy the B2 byte position.

The BCID field in the STS-1P overhead is used to carry a unique code assigned to each STS-1P signal associated with broadband matrix 20. The BCID is the sequential address of the termination point at the matrix and is used to determine whether proper end-to-end connections are maintained in the matrix. Line termination equipment determines the value of the BCID for each STS-1P at the time of the cross-connection and stores the code at the termination point of the matrix. The channel identification monitor 226 at the termination point receives byte-parallel, byte-aligned STS-1P signal, and extracts the BCID from the STS-1P overhead. The extracted value is then compared with the stored BCID. A mismatch between the extracted BCID and the stored code indicates an error in the cross connection in the broadband matrix. Note that the length of the BCID may exceed one byte and may be transported in successive STS-1P frames.

The EC-BIP and BCID codes in the STS-1P overhead are continuously generated and monitored at the end points of the broadband fault coverage area for fault detection and redundant plane selection. Frame error and out-of-frame conditions are also monitored at the end points. Broadband fault coverage end points include the high speed optical and electrical units and tributary signal processors in wideband matrix subsystem 16. More specifically in one embodiment, network packs 160–166 of high speed electrical units 32 generate and check the EC-BIP value for both inbound and outbound traffic directions. Network packs 160–166 also generates and monitors the BCID to determine proper matrix connections are established. In high speed optical units 30, optical terminators 120 and 138 generate and extract section and line overheads including EC-BIP and BCID fields. Certain other section and line overhead fields are generated and terminated at attached processors 140 and 142.

Once a path fault is detected, the equipment that caused the fault is determined. A path fault isolation process is initiated to detect the location of the fault. In normal operation, the SME bit is set to permit fault isolation error conditions to be continuously monitored and reported only at the end points. However when an error is reported, monitor circuits in the matrix interface units and in the matrix along the failed path are activated to locate the failed equipment. In order to isolate a fault under intermittent failure conditions, all the monitors along the failed data path must monitor the same data segment. If the monitoring period at each monitor point is synchronized by a central control structure, the monitor circuits will not start and stop monitoring at the same time due to command latency through the control structure. Therefore the SME bit is used to synchronize the fault isolation process to ensure that each monitor in the data path is checking the same data segment.

Figure 7:
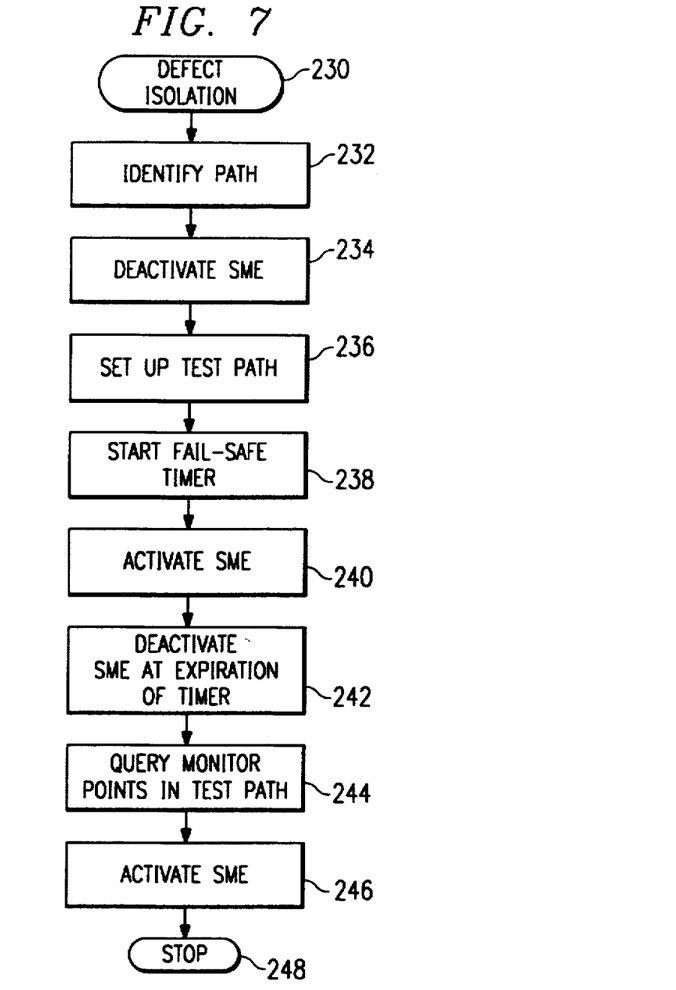
FIG. 7 is a flowchart of path defect isolation.
Figure 8:
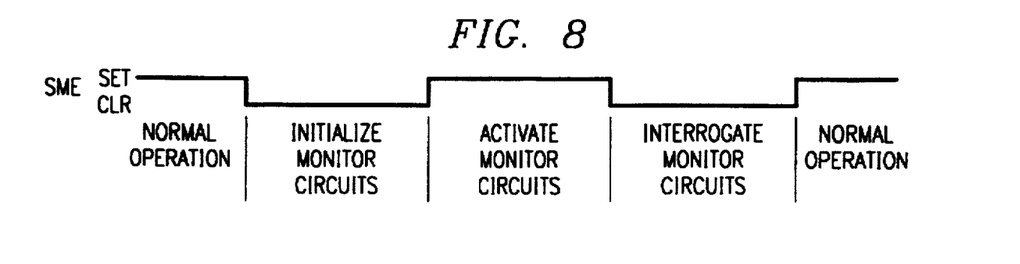
FIG. 8 is diagram illustrating the logic and timing of the STS-1P monitor enable bit.

Referring to FIG. 7, a flowchart of the defect isolation process 230 is shown. When an error is detected at a fault coverage end point, the error is reported, and the path traversed by the signal is identified, as shown in block 232. In block 234, the STS-1P monitor enable (SME) is deactivated by resetting the corresponding bit in the STS-1P overhead at the origination point of the data path. Upon receipt of the cleared SME bit in the STS-1P overhead, downstream monitors in the test data path immediately stop the monitoring activity and are initialized, as shown in block 236. Monitors not in the test data path are not affected and continues to monitor and report faults. In blocks 238 and 240, a timer initialized with a predetermined test period is started as the SME is set in the STS-1P overhead. The monitors in the test data path are activated upon receipt of the SME bit, and begin to monitor and report errors for the set time period. At the expiration of the timer, the SME is again reset, as shown in block 242. All the monitors in the test data path are then interrogated to isolate the origination of the fault to a specific equipment or device, as shown in block 244. Recovery procedures may then be initiated to remove or circumvent the faulty equipment. Normal operation resumes after the SME bit is set, as shown in block 246. The fault isolation procedure ends in block 248. The fault isolation sequence as synchronized by the SME bit is summarized in FIG. 8.

Although not described in detail herein, the IOL structure and fault coverage and isolation in wideband subsystem 16 operate in a substantially similar manner. In particular, asynchronous signals carried through wideband subsystem 16 are carried in matrix payload capacity (MPC) payloads. MPC signals use the synchronous frame format of the corresponding virtual tributary signal but with modified definition and usage of the overhead fields similar to that of the STS-1P overhead fields. VT and MPC signals are mapped into matrix payload envelope (MPE) signals for transport through wideband matrix 22. A channel overhead (COH) byte carries a parity field for each MPE or MPC channel and a VT parity (VTP) byte carries a parity field for the entire VT or MPC. The VTP is primarily defined to provide end-to-end coverage for payloads that require more than one MPE channel for transport. The COH is defined over a 24 frame superframe and the VTP is defined over a four frame superframe. The COH signal carries a wideband channel identification code (WCID) similar to the BCID described above. The COH also carries a BIP-2 field generated over the payload of a MPE or MPC channel and a channel monitor enable (CME) similar to the SME described above.

Although the present invention and its advantages have been described in detail, it should be understood that various changes, substitutions and alterations can be made therein without departing from the spirit and scope of the invention as defined by the appended claims.

What is claimed is:

1. A cross-connect system comprising:
   a broadband matrix;
   at least one high speed line terminating equipment coupled to a telecommunications network;
   an integrated office link interconnecting said broadband matrix and high speed line terminating equipment, said integrated office link carrying duplex transmission of an IOL-N signal of N multiplexed STS-1P optical signals at an OC-N rate; and
   said broadband matrix and said high speed line terminating equipment each including an optical interface circuitry coupled to said integrated office link and receiving and transmitting said STS-1P optical signals and further converting between said N multiplexed STS-1P optical signals and N demultiplexed STS-1P electrical signals, said IOL-N signal including payload and overhead fields carrying control information and fault coverage data, said IOL-N overhead fields include a channel identification code associated with each of said STS-1P signal indicative of a cross connection channel in said broadband matrix, and a parity code indicative of a parity value of said STS-1P signal.

2. The system, as set forth in claim 1, further comprising attached processors coupled to said high speed line terminating equipment receiving and terminating overhead fields from the telecommunications network, and being further coupled to said optical interface circuitry and receiving said IOL-N overhead fields for processing.

3. The system, as set forth in claim 1, wherein said IOL overhead fields include STS-1P overhead fields, network overhead transport fields, fault coverage fields, and communication channel fields.

4. The system, as set forth in claim 1, wherein said at least one high speed line terminating equipment includes circuitry for receiving network signals, extracting overhead fields therefrom, and generating STS-1P signal with IOL-N overhead fields for transmission on said integrated office link to said broadband matrix.

5. The system, as set forth in claim 1, wherein said IOL-N overhead fields include a channel identification code associated with each of said STS-1P signal indicative of a cross connection channel in said broadband matrix, and a parity code indicative of a parity value of said STS-1P signal.

6. The system, as set forth in claim 5, further comprising broadband fault coverage end points including said high speed line terminating equipment.

7. The system, as set forth in claim 6, wherein said fault coverage end points include fault monitors monitoring said channel identification code and parity code and detecting associated faults.

8. The system, as set forth in claim 5, further comprising broadband fault coverage monitors including said high speed line terminating equipment and said optical interface circuitry.

9. The system, as set forth in claim 7, wherein said IOL-N overhead fields further comprising a STS-1P monitor enable synchronizing a fault isolation process along a test path, said test path comprising enabled fault monitors along said test path.

10. The system, as set forth in claim 1, further comprising:
    a wideband matrix;
    a second integrated office link interconnecting said wideband matrix and said broadband matrix carrying duplex transmission of said IOL-N signal therebetween.

11. The system, as set forth in claim 10, further comprising a tributary signal processor coupled between said wideband matrix and said second integrated office link, each said tributary signal processor and said broadband matrix including an optical interface circuitry coupled to said second integrated office link.

12. The system, as set forth in claim 11, further comprising:
    at least one low speed line terminating equipment coupled to a telecommunication network;
    a third integrated office link interconnecting said wideband matrix and said low speed line terminating equipment carrying duplex transmission of said IOL-N signal therebetween; and
    said low speed line terminating equipment and said wideband matrix each including said optical interface circuitry coupled to said third integrated office link.

13. The system, as set forth in claim 12, further comprising wideband fault coverage end points including said low speed line terminating equipment.

14. The system, as set forth in claim 13, wherein said IOL-N signal includes overhead fields having a channel identification code and a parity code for fault coverage, and said end points include fault monitors monitoring said channel identification code and parity code and detecting associated faults.

15. The system, as set forth in claim 14, wherein said IOL-N overhead fields further comprising a STS-1P monitor enable synchronizing a fault isolation process along a test path, said test path comprising enabled fault monitors along said test path.

16. The system, as set forth in claim 1, further comprising broadband fault coverage end points including said high speed line terminating equipment.

17. An integrated multiple cross-connect system comprising:
   a broadband matrix;
   at least one remotely located high speed line terminating equipment coupled to a telecommunications network;
   an integrated office link interconnecting said broadband matrix and high speed line terminating equipment, said integrated office link carrying duplex transmission of an IOL-N signal of N multiplexed STS-1P optical signals at an OC-N rate, said STS-1P signal including data payload and overhead fields;
   a remotely located wideband matrix;
   a second integrated office link interconnecting said broadband matrix and said remotely located wideband matrix;
   at least one remotely located low speed line terminating equipment coupled to a telecommunications network;
   a third integrated office link interconnecting said wideband matrix and low speed line terminating equipment; and
   broadband fault coverage end points including said high speed line terminating equipment.

18. The system, as set forth in claim 17, further comprising an optical interface circuitry coupled to each end of each integrated office link and receiving and transmitting said STS-1P optical signals and further converting between said N multiplexed STS-1P optical signals and N demultiplexed STS-1P electrical signals, said IOL-N signal including overhead fields carrying control information and fault coverage data.

19. The system, as set forth in claim 18, further comprising attached processors coupled to said high speed line terminating equipment receiving and terminating overhead fields from the telecommunications network, and being further coupled to said optical interface circuitry and receiving said IOL-N overhead fields for processing.

20. The system, as set forth in claim 17, wherein said IOL-N overhead fields include STS-1P overhead fields, network overhead transport fields, fault coverage fields, and communication channel fields.

21. The system, as set forth in claim 17, wherein said at least one high speed line terminating equipment includes circuitry for receiving network signals, extracting overhead fields therefrom, and generating STS-1P signal with IOL-N overhead fields for transmission on said integrated office link to said broadband matrix.

22. The system, as set forth in claim 17, wherein said IOL-N overhead fields include a channel identification code associated with each of said STS-1P optical signals indicative of a cross connection channel in said broadband matrix, and a parity code indicative of a parity value of each of said STS-1P optical signals.

23. The system, as set forth in claim 22, wherein said broadband fault coverage end points include fault monitors monitoring said channel identification code and parity code and detecting associated faults.

24. The system, as set forth in claim 22, further comprising broadband fault coverage monitors including said high speed line terminating equipment and said optical interface circuitry.

25. The system, as set forth in claim 23, wherein said IOL-N overhead fields include an STS-1P monitor enable for synchronizing a fault isolation process along a test path, said test path comprising enabled fault monitors along said test path.

26. A method for interconnecting remotely located cross-connect matrices and associated line terminating equipment coupled to a telecommunications network, comprising the steps of:
   receiving a network signal including network data and overhead fields from said telecommunications network;
   extracting said network overhead fields;
   processing and terminating selected network overhead fields, converting said network signal to a STS-1 signal, generating and inserting IOL overhead fields including control and fault coverage information into said STS-1 signal, and generating a STS-1P signal, said IOL overhead field generating step includes the steps of:
      determining a matrix cross-connection path for said STS-1P signal;
      generating a unique channel identification code associated with said matrix cross-connection path, and inserting said channel identification code into said IOL overhead;
      determining a parity value for said STS-1P signal; and inserting said parity value into said IOL overhead;
   converting said STS-1P signal into an optical IOL signal, and transmitting said IOL signal on an integrated office link to a remote cross-connect matrix;
   said remote cross-connect matrix receiving said IOL signal, converting said IOL signal to an electrical STS-1P signal;
   extracting said overhead fields from said STS-1P signal and processing said extracted overhead fields; and
   cross-connecting said STS-1P signal.

27. The method, as set forth in claim 26, wherein said IOL-N overhead field generating step includes the steps of:
   determining a matrix cross-connection path for said STS-1P signal;
   generating a unique channel identification code associated with said matrix cross-connection path, and inserting said channel identification code into said IOL-N overhead field;
   determining a parity value for said STS-1P signal; and
   inserting said parity value into said IOL-N overhead field.

28. The method, as set forth in claim 26, further comprising the steps of:
   defining fault coverage end points;
   monitoring said channel identification code and parity value in said IOL overhead at said fault coverage end points; and
   detecting and reporting fault.

29. The method, as set forth in claim 28, further comprising the steps of:
   identifying a transmission path of a STS-1P signal incurring a detected fault;
   setting up a test path having multiple fault monitors, said test path corresponding to said transmission path;
   monitoring said channel identification code and parity value in said IOL overhead at multiple points along said test path; and
   determining a source of fault in response to said monitoring step.

30. The method, as set forth in claim 29, further comprising the steps of:
   including a monitor enable in said IOL overhead;
   resetting said monitor enable after said transmission path identification step;
   starting a fault isolation timer and setting said monitor enable after said test path setting up step;
   resetting said monitor enable after expiration of said fault isolation timer; and
   setting said monitor enable after said fault source determining step.

31. The method, as set forth in claim 29, wherein said fault source determining step includes the step of polling each fault monitor along said test path.

32. The method, as set forth in claim 26, after said STS-1P signal cross-connecting step, further comprising the steps of:
converting said STS-1P signal into said IOL signal, and transmitting said IOL signal on a second intergrated office link to a second remote cross-connect matrix;
said second remote cross-connect matrix receiving said IOL signal, converting said IOL signal to an electrical STS-1 signal;
extracting said overhead fieids from said STS-1 P signal and processing said exstracted overhead fields; and
cross-connecting said STS-1P signal.

33. The method, as set forth in claim 26, after said STS-1P signal cross-connecting step, further comprising the steps of:
converting said STS-1P signal into said IOL signal, and transmitting said IOL signal on said integrated office link to a line terminating equipment;
said line terminating equipment receiving said IOL signal, converting said IOL signal to an electrical STS-1P signal;
extracting said overhead fields from said STS-1P signal and processing said extracted overhead fields;
inserting network overhead fields and generating a network signal; and
transmitting said network signal to said telecommunications network.

34. The method, as set forth in claim 26, further comprising the step of extracting timing information from said IOL signal transmitted on said integrated office link.

35. The method, as set forth in claim 26, further comprising the step of routing said extracted network overhead fields to an attached processor for processing and line termination.

* * * * *